United States Patent
Corradini et al.

(10) Patent No.: US 6,467,593 B1
(45) Date of Patent: Oct. 22, 2002

(54) HYDRAULIC SHOCK ABSORBER WITH PROGRESSIVE BRAKING EFFECT

(76) Inventors: Mauro Corradini, via Gastinelli, II, 42100 Reggio Emilia (IT); Eric Frantz Regnier, via Gastinelli, II, 42110 Reggio Emilia (IT)

( * ) Notice: Subject to any disclaimer, the term of this patent is extended or adjusted under 35 U.S.C. 154(b) by 0 days.

(21) Appl. No.: 09/671,015

(22) Filed: Sep. 28, 2000

(51) Int. Cl.$^7$ .................................................. F16F 9/48
(52) U.S. Cl. ................................. 188/289; 188/282.9
(58) Field of Search ............................. 188/284, 289, 188/286, 288, 297, 312, 313, 314, 281, 282.4, 282.9; 267/64.18, 217

(56) References Cited

U.S. PATENT DOCUMENTS

| | | | | |
|---|---|---|---|---|
| 462,970 A | * | 11/1891 | Krone | 267/31 |
| 1,655,786 A | * | 1/1928 | Guerritore | 267/31 |
| 2,069,791 A | * | 2/1937 | Wallace | 267/64 |
| 2,212,541 A | * | 8/1940 | Isaacson | 188/282 |
| 2,994,442 A | * | 8/1961 | Frederick | 213/43 |
| 3,265,163 A | * | 8/1966 | Gilbert et al. | 188/282 |
| 3,706,362 A | * | 12/1972 | Faure | 188/282 |
| 3,853,311 A | * | 12/1974 | Kreuzer et al. | 267/64 R |
| 4,039,177 A | * | 8/1977 | Person et al. | 267/126 |
| 4,405,119 A | * | 9/1983 | Masclet et al. | 267/64.22 |
| 4,624,346 A | * | 11/1986 | Katz | 188/282 |
| 4,655,440 A | * | 4/1987 | Eckert | 267/64.11 |
| 4,700,815 A | * | 10/1987 | Persicke et al. | 188/286 |
| 5,160,123 A | * | 11/1992 | Danieli | 267/226 |
| 5,509,513 A | * | 4/1996 | Kiesel | 188/289 |
| 6,032,933 A | * | 3/2000 | Beck | 267/64.17 |

* cited by examiner

Primary Examiner—Douglas C. Butler
Assistant Examiner—Benjamin A Pezzlo
(74) Attorney, Agent, or Firm—Oblon, Spivak, McClelland, Maier & Neustadt, P.C.

(57) ABSTRACT

An hydraulic shock absorber with progressive braking effect comprising a cylinder (1,2) full of fluid and a piston (3) sliding axially into said cylinder. The piston (3) divides into two sequential chambers (8) and (9) the cylinder compartment (1). In the extension and/or compression operation, the piston (3) slides in the cylinder causing the fluid to move from the lower chamber (9) to the upper chamber (8) and viceversa, through ports (10) and compression (16) and extension (12) valves, with regulated and progressive opening/closing, with passages with calibrated and/or variable geometry.

8 Claims, 6 Drawing Sheets

HYDRAULIC SHOCK ABSORBER WITH PROGRESSIVE BRAKING EFFECT

FIELD OF THE INVENTION

The present invention refers to a hydraulic shock absorber with progressive braking effect.

More particularly, the present invention relates to a hydraulic shock absorber with progressive braking effect comprising a cylinder fixed to the body filled with a fluid and a piston sliding in the cylinder and dividing it into two sequential chambers.

The piston slides in the cylinder causing the fluid to move from the lower chamber to the upper chamber, and vice versa, through ports and compression and extension valves with and progressive opening/closing, with passages with calibrated and/or variable geometry.

The hydraulic shock absorber of the present invention is particularly suitable for transportation and competition vehicles.

BACKGROUND OF THE INVENTION

It s known that, in the suspension systems of the conventional transportation and competition vehicles, the oscillations derived from the reactions occurring on the suspension elastic components, in relation to the conditions of contact and adherence with the ground, are controlled be means of hydraulic shock absorbers with braking effect.

It is also known that, according to a generic evaluation and taking into account the fact that the magnitude of the braking effect affects the behaviour of the vehicles while they are running, the adoption of shock absorbers with relatively more braked action makes it possible to obtain better vehicle stability, but affects negatively their comfort. On the other hand the adoption of shock absorbers with less braked action produces opposite conditions, i.e. it makes it possible to obtain better comfort to the detriment of stability. In practice, the braking effect of the shock absorbers, in their extension and compression movements, is regulated according to compromise standards, depending on the specific intended uses of the vehicles and/or the particular tastes and requirements of the users.

A significant aspect to be evaluated when regulating the braking effect of shock absorbers is the load which can or must be borne by the vehicles. Depending on the load applied, the elastic suspension components react and are compressed, by reducing in length, for corresponding valves.

An erroneous evaluation of the braking effect, which may be more or less powerful depending on the load, may jeopardise the correct stability of the vehicles in motion.

Oscillation and/or instability phenomena related to the load can also be detected in vehicles in special situation of operation, such as, for example, sustained run on courses with turns, sudden accelerations and/or application of the brakes. For example, it is known that, in the case of curvilinear motion, a sudden change occurs in the distribution of weights, due to the effect of the centrifugal force. A considerable part of the load borne by the inside wheels, in turn, is transferred to the outside wheels and this effect produces greater compression of the elastic components of the corresponding suspensions, with proportional increase of the magnitude of their reactions and consequent requirements to correct said situation by increasing the braking effect of the shock absorbers, in order to prevent the wheel from bouncing. On the other hand, the inverse phenomenon occurs on the suspensions of the inside wheel, on which the load is lightened. Since the magnitude of the reaction of the elastic components, due to the lower load, is reduced, the shock absorbers undergo distension which requires a proportionally reduced braking effect, so that the wheel may correctly follow the condition of the course. Similar phenomena occur in the case of sudden acceleration and/or application of the brakes, in which the more loaded axle benefits from a greater braking effect of the shock absorbers and the less loaded axle benefits from the opposite, reduced braking effect. Basically, an elastic component, such as, for example, a spiral spring which, as it is compressed, reduces its length and, progressively increases the magnitude of its reaction, should operate in parallel with a shock absorber which would progressively increase its braking effect during compression. Vice-versa, as the two components distend, the braking effect should similarly be progressively reduced.

The progressive increase or decrease of the braking effect of the shock absorber can be obtained by applying, between the movable arms of the suspension and the body of the vehicles, some components, as second connectors of the shock absorbers. These components, as the geometry of the turning fulcra varies, increase or decrease the speed of the movement of the shock absorbers themselves.

However, taking into account that, in general, the elastic components use the same connectors, also the magnitude of their reactions is substantially proportionally heightened. Nevertheless, in any case, there is still a discrepancy between the magnitude of the reactions of the elastic components and the magnitude of the braking effect of the shock absorbers. This system presents also the drawback of being rather expensive and of not being very reliable because of the numerous components of the suspensions.

SUMMARY OF THE INVENTION

The object of this invention is to eliminate the above drawbacks.

In its general aspect, the present invention allows to achieve this and other objects by providing the variable volume sequential chambers of the cylinder, wherein the piston slides, with compression and extension valves with regulated and progressive opening/closing, combined with ports having variable geometry passages. Subject matter of the present invention is, therefore, a hydraulic shock absorber with progressive braking effect comprising:

- a cylinder anchored to the body of the vehicle and filled with a driving fluid;
- a piston anchored to a mobile component of a suspension and sliding axially into said cylinder; said piston dividing the sliding seat into two sequential coaxial chambers; and
- means for connecting said chambers between them and through which the driving fluid is thrusted into one or the other chamber depending on the compression and/or extension action of the piston, wherein, the connection means consist of (i) at least one stationary component, having optionally a variable section, which is engaged by introduction into a stationary opening of the piston and (ii) calibrates section passages with an adjustable and progressive closing/opening, depending on the pressure of the driving fluid.

The advantages achieved by the hydraulic shock absorber with progressive braking effect of the present invention consist essentially in that, to each change of distension and/or compression travel of the suspensions, deriving from variations of load or of speed, corresponds a proportional travel of the pistons of the shock absorbers, whose braking effect is automatically regulated by the proportional opening/closing of the passage ports. Said adjustments are obtained by means of opening/closing variable geometry ports with through sections proportional to the compression and/or extension travel of the shock absorbers, as well as by means of progressive opening/closing of compression and extension valves associated with the sequential chambers of the shock absorbers. The progressively opening ports and the valves may also be provided with external means of adjustment, on which it is possible to intervene simply and rapidly, so as to modify the intervening behaviour of the braking effect of the shock absorbers, as a function of the load, speed and/or the users' particular tastes or guide requirements.

Another advantage consists in that the hydraulic shock absorbers with progressive braking effect are applicable to recreational or competition automobiles and motorcycles, with possible equal conditions of possible intervention on external means of adjusting the opening/closing of the variable geometry ports and of the compression and extension valves.

The present invention and its aspect will be more readily understood from the following description of the accompanying drawings showing some embodiments of the hydraulic shock absorber of the present invention and in which:

BRIEF DESCRIPTION OF THE DRAWINGS

FIGS. 1a and 1b represent the schematic views of the circuit diagram of a first example of embodiment of the hydraulic shock absorber with progressive braking effect of the present invention with a detailed view of the variable section ports of the compression and extension valves.

DETAILED DESCRIPTION OF THE INVENTION

The attached drawings concern the operation of the invention in the various phases of operation and not their actual construction configuration. The shock absorber of the present invention comprises an external cylinder 1, coaxial with an internal cylinder 2, in which a piston 3 slides. In the example, the upper connector 6 fixed to the external cylinder 1 represents the anchoring to the body of a vehicle, and the lower connector 7, fixed to the piston 3, represents the anchoring to the mobile components of the suspension of a wheel of a vehicle which, as such, is forced to oscillate upward and downward, following the corresponding movements of the wheel itself in following the ground configuration, during all driving conditions.

For the sake of simplicity of description of the device, the necessary hydraulic sealing means of the various components and the actual possible construction configurations are not shown in the drawings.

As is known, the braking effect of a hydraulic shock absorber is obtained by means of piston 3 which divides cylinder 2 into two coaxial communicating chambers: an upper 8 and a lower 9 chambers.

In the cylinder 2 said piston 3 is inserted and can slide. The upper 8 and 9 chambers are full of fluid and the fluid can move from one to the other through calibrated ducts, according to the compression or extension movements made by piston 3 along the cylinder, due to the displacements produced by its stem 4 connected to lower connector 7.

Figure 4:
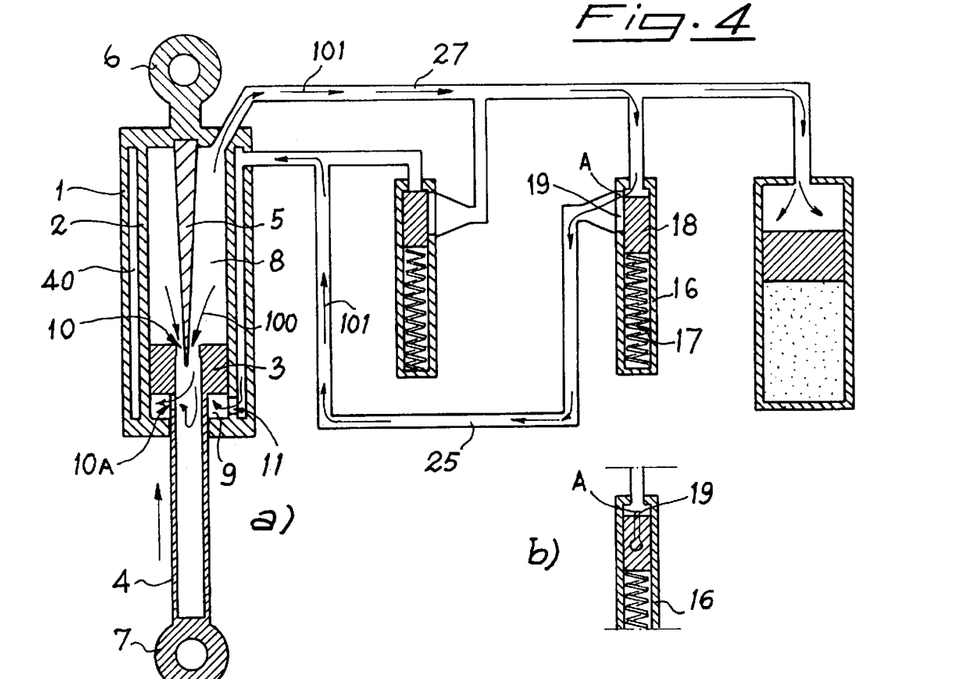
FIGS. 4a and 4b represent the diagram of FIGS. 1a and 1b in maximum extension position and in initial compression at low speed conditions.

With the shock absorber fully extended and at the beginning of the compression movement at low speed (FIGS. 4a and 4b), part of the fluid present in upper chamber 8 moves (in the direction of arrows 100) into lower chamber 9 through a hole 10 of the piston 3, partially occluded by a coaxial pin 5, which has, preferably, a variable section, with continuous progressive increase or increase step-by-step.

Figure 5:
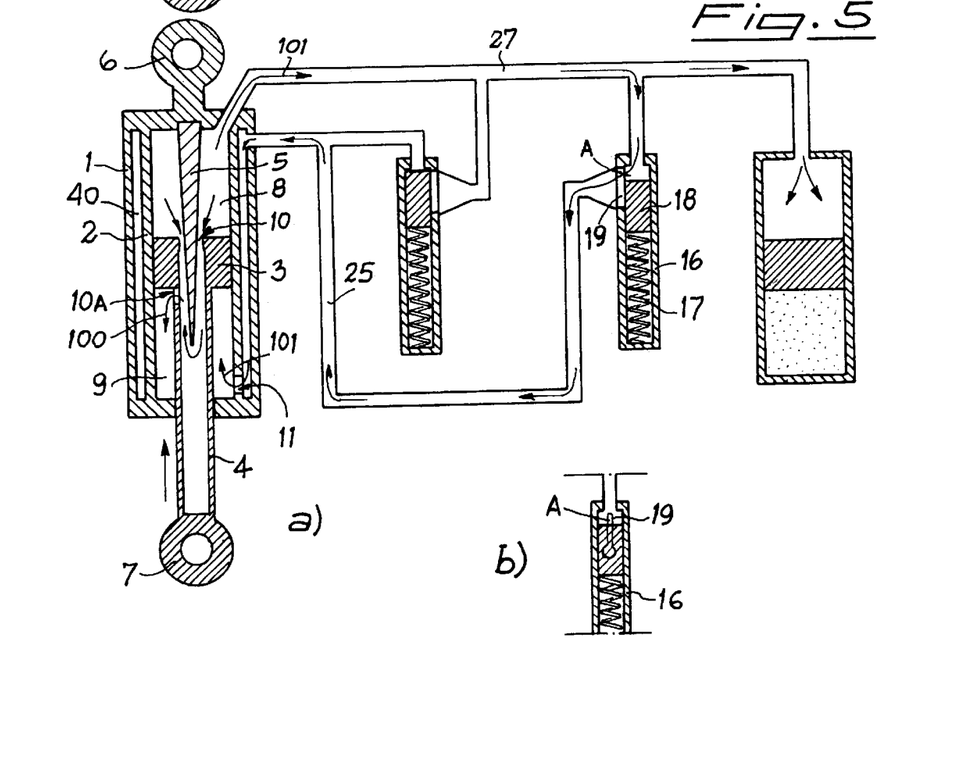
FIGS. 5a, 5b and 6a, 6b represent the diagram of FIGS. 4a and 4b in mid and end of run, at low speed conditions.
Figure 6:
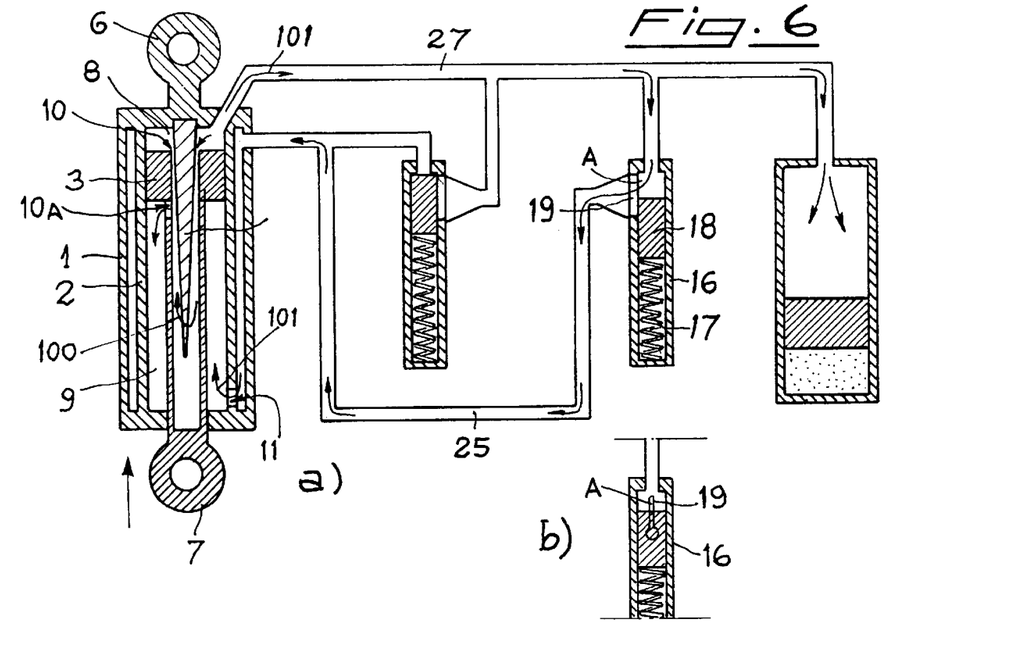
Figure 7:
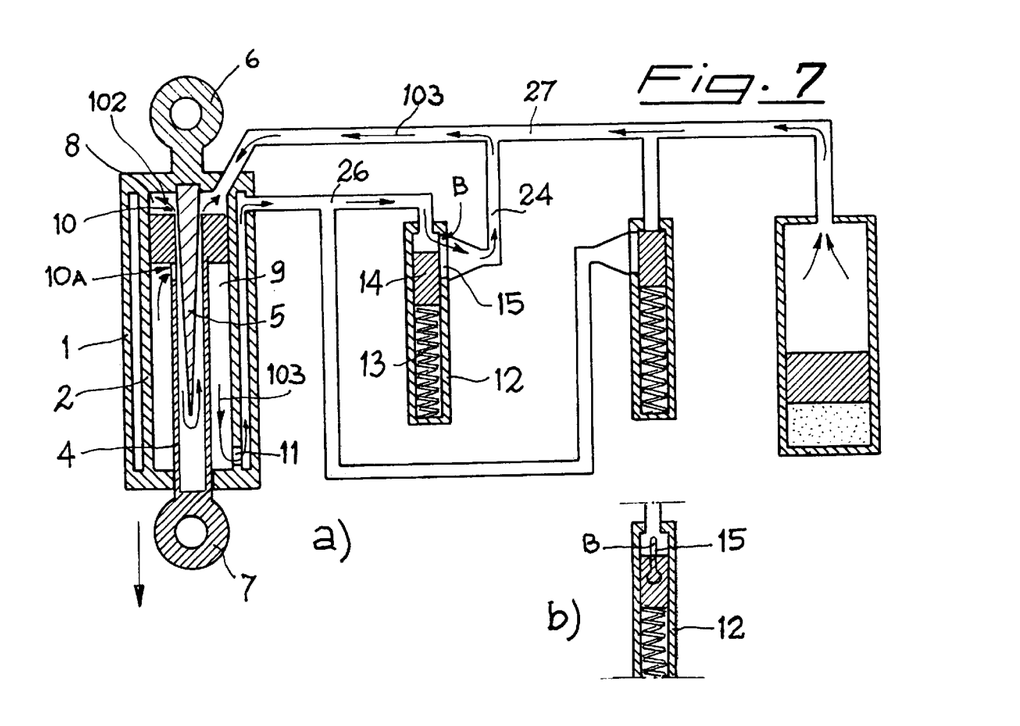
FIGS. 7a and 7b represent the diagram, in initial extension at, low speed conditions, starting from maximum compression.
Figure 8:
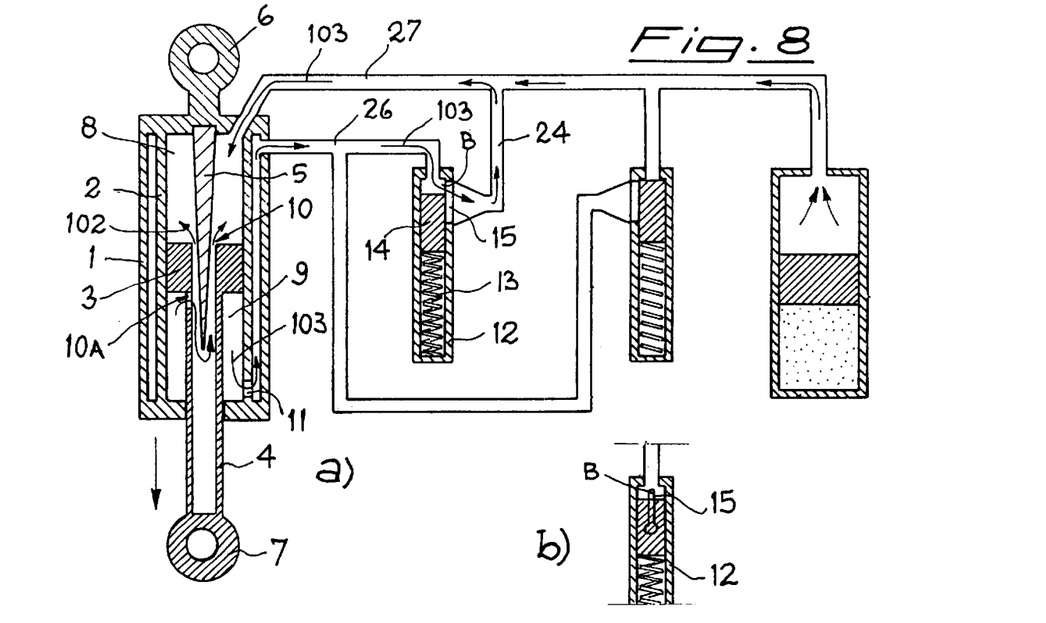
FIGS. 8a, 8b and 9a, 9b represent the diagram of FIGS. 7a and 7b in mid and end of run, at low speed conditions.
Figure 9:
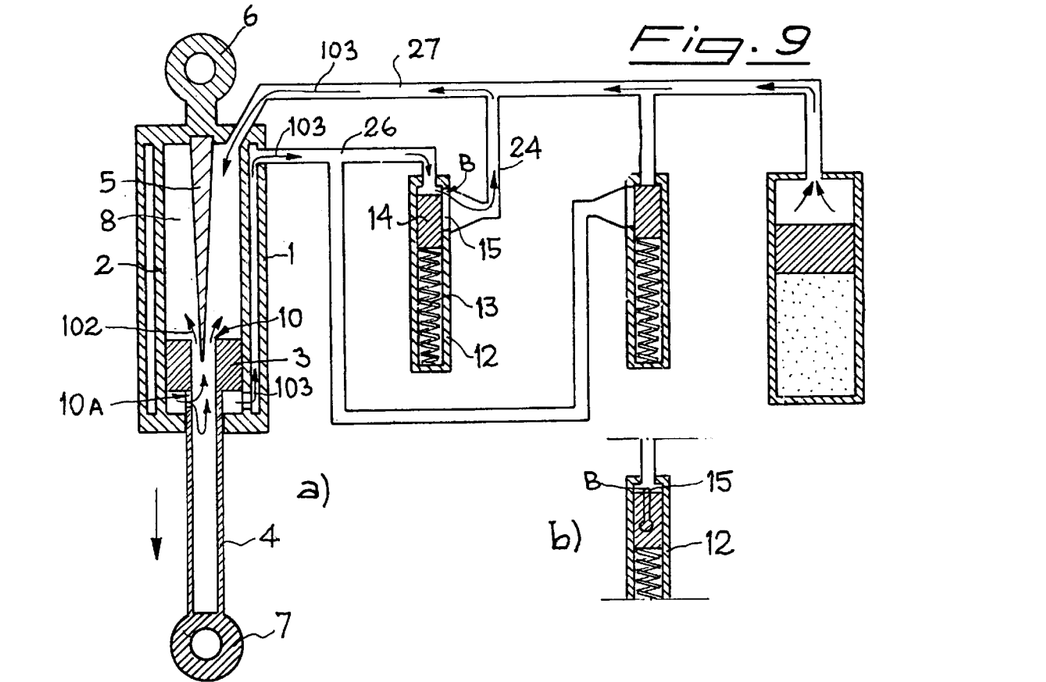
Figure 10:
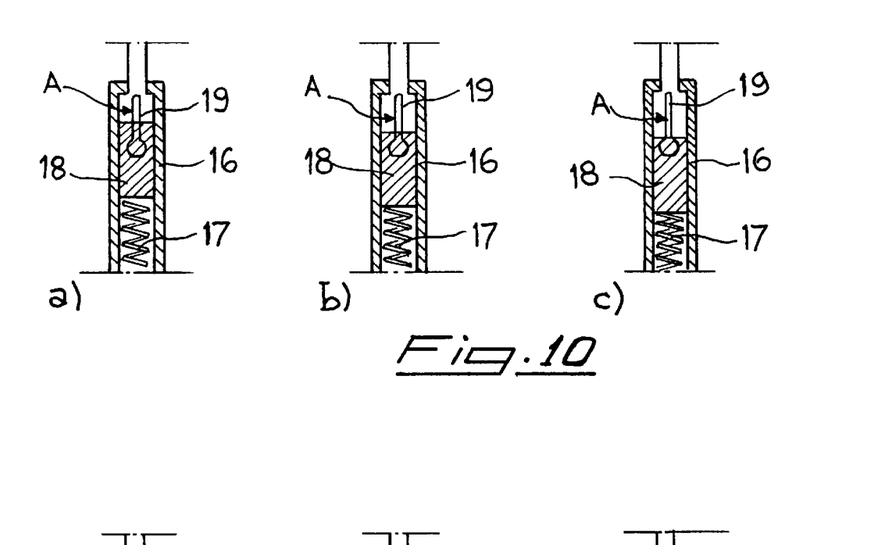
FIGS. 10a, 10b and 10c illustrate the opening position of the compression valve in the conditions of the shock absorber at initial, mid run and maximum compression, at high speed.
Figure 11:
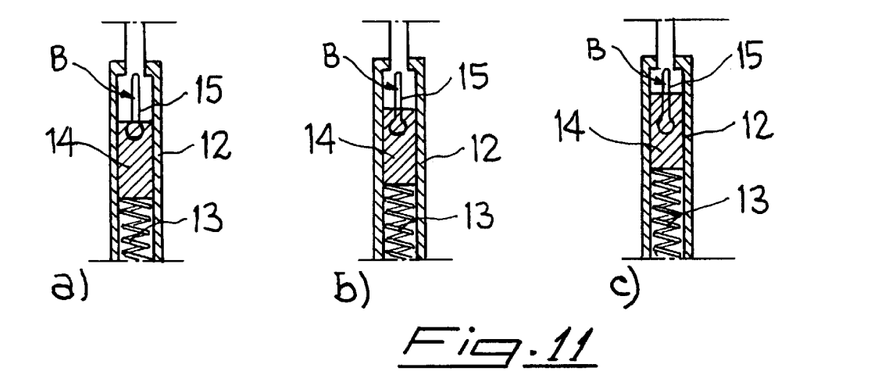
FIGS. 11a, 11b and 11c illustrate the opening position of the extension valve in the conditions of the shock absorber at initial, half run and maximum extension, at high speed.

In the illustrated embodiment, the pin 5 is basically cone-shaped and overturned and, as the position of the piston in compression phase changes, its section gradually reduces the through ports of hole 10. From hole 10, the fluid moves into lower chamber 9 through a communication opening 10a, made at the top of hollow stem 4. The other part of the fluid is instead forced to exit from chamber 8 through line 27 (according to the direction of arrows 101) and to reach compression valve 16 provided with a piston 18 and a spring 17. In order to continue its course, the fluid is forced to press on piston 18 and the displacement of the piston 18 opens a port 19 provided in the valve 16 until section A of said calibrated port 19 (FIGS. 4a and 4b) is sufficient to allow it to pass through, at that speed. From said passage, the fluid reaches chamber 9 through a fact 25, the interspace between the two coaxial cylinders 1 and 2 and through a hole 11. Essentially, in order to pass through valve 16, the fluid must exercise pressure on piston 18, proportionally to the magnitude of the reaction which the counter spring 17 exercises on the piston 18 in order to keep it closed, against the entry of line 27. Thus, a braking effect is generated in the piston 3—stem 4 assembly of the shock absorber, proportional to the resistance of spring 17, multiplied by the ratio between the surface area to piston 18 of valve 16 and that of piston 3 of cylinder 2. As the shock absorber is compressed (FIGS. 5a, 5b), the area of through hole 10 of the fluid decreases according to the increase of the section of pin 5, integral with cylinder 1–2. At equal sliding speed of the piston 3—stem 4 assembly, the choke of passage 10 by pin 5 forces a greater amount of fluid to follow the path of line 27, to pass through compression valve 16. The higher flow rate requires a larger passage area A of port 19, with consequent greater pressure on piston 18 and greater compression of counter spring 17. Due to the fact that the magnitude of the reaction of the spring is proportional to its compression, the resistance to the passage of the liquid increases, with corresponding proportional increase also of the braking effect. If the piston 3—stem 4 assembly proceeds in its compression run inside cylinder 1–2 (FIGS. 6a and 6b), until it is near maximum compression, the amount of fluid which can pass through port 10 becomes minimal or even zero, since its through section is occupied by pin 5, the section thereof, at that point, can be equal or almost or almost equal to that of the port 10. In such a case, the fluid can only be forced to move from upper chamber 8 to lower chamber 9 through duct 27 and compression valve 16, farther displacing piston 18 and compressing even more spring 17 (with respect to the previously described positions), until section A of calibrated port 19 is sufficient to allow a greater volume of fluid to circulate, at the same speed, with consequent greater braking effect of the system.

When the direction of the movement of piston 3 in the cylinder is inverted, during extension action, the previously described phases perform in a completely opposite way (FIGS. 7a, 7b 8a, 8b 9a, 9b and direction of arrows 102 and 103), involving extension valve 12.

Starting from minimum extension of the piston 3, the pin 5 occupies a larger section of the hole 10, creating a strong braking effect which, however, gradually decreases, as piston 3 extends and the free section of hole 10 increases, allowing the fluid to pass from upper chamber 8 to lower chamber 9. The other portion of the fluid discharges through port 11 and line 26, to return to upper chamber 8 through extension valve 12. This discharge of the fluid originates movements and reactions on piston 14 and on spring 13 and changes in through area B of calibrated port 15 which, at equal speed, correspond to those previously described for compression valve 16, although with progressively decreasing braking effect, depending on the extension of the shock absorber.

When the compression and/or extension speed of the piston 3—stem 4 assembly (see FIGS. 10a, b and c and 11a, b and c) is increased, the volume of fluid circulating in a unit of time greater, but, since the passage area available between pin 5 and port 10 is variable only according to the position of the piston 3—stem 4 assembly in the cylinder, the greater amount of fluid is forced to displace pistons 18 or 14 of valves 16 or 12, to a greater extent, until passage areas A of B of calibrated ports 19 or 15 are sufficient to allow said volume to pass through, with consequent greater reactions of springs 17 or 13 and corresponding greater braking effects.

Figure 12:
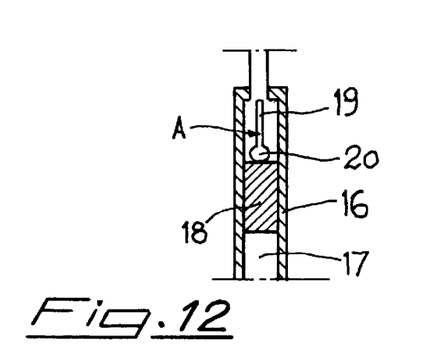
FIG. 12 illustrates the opening position of the compression valve, in the conditions of the shock absorber under compression, at very high speed, FIG. 13 illustrate the opening position of the extension valve in extension condition of the shock absorber, at very high speed.
Figure 13:
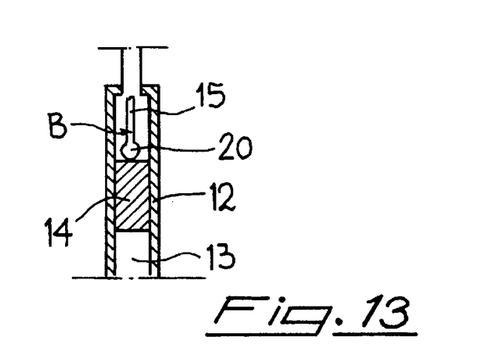

In order to allow proper functionally of the shock absorbers, even in the case of operations with excessive speed increments, the compression and/or extension intervention can be adequately corrected by performing calibrated ports 19 and 15, of compression 16 and extension 12 valves, with through areas of lower end 20 suddenly increased. These additional through section allow greater fluid passage clearance and circulation, preventing too violent or too weak braking effects.

Figure 14A:
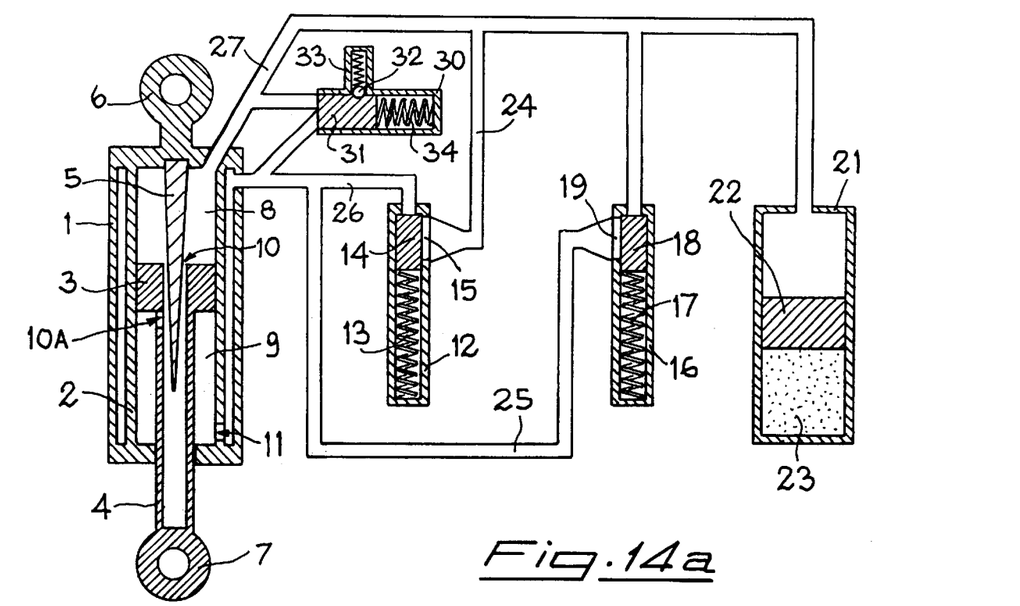
FIG. 14a represents the schematic view of the circuit diagram of the same hydraulic shock absorber with progressive braking effect of FIG. 1a and 1b, equipped with bypass valve, for applications on special vehicles, such as competition vehicles, in resting conditions.
Figure 14B:
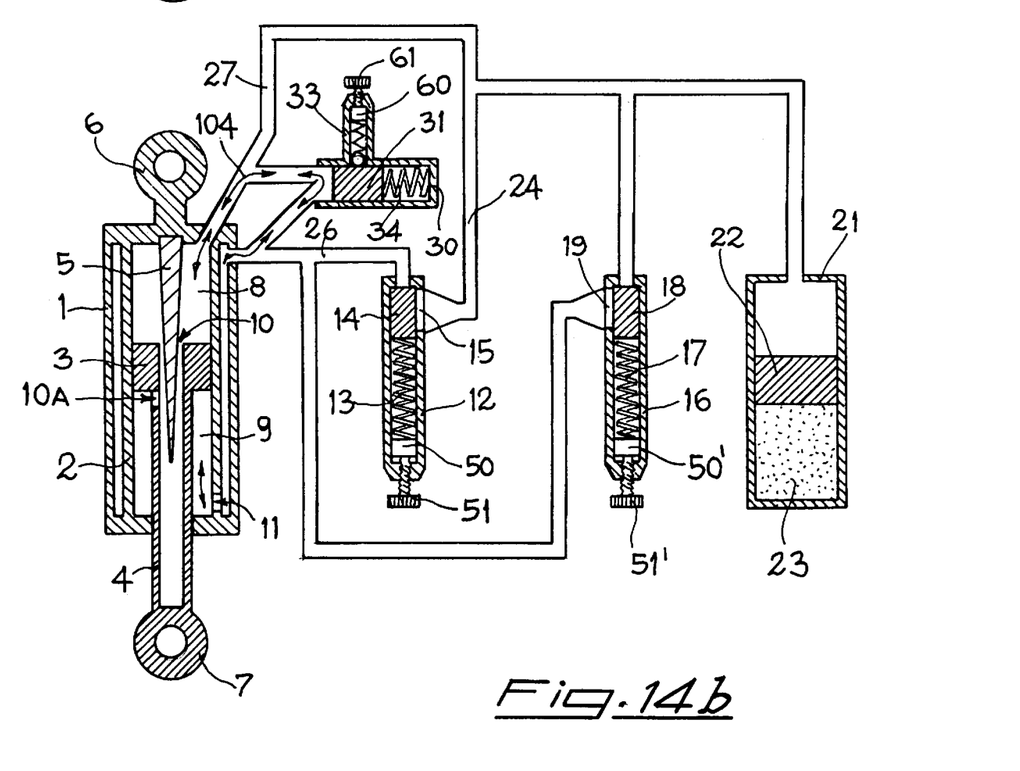
FIG. 14b represents the schematic view of the same diagram of FIG. 14a, with the bypass valve in operation.

For more specific applications, such as, for example, those pertaining to competition automobiles which, while racing at high speed, may travel with the wheels on special profiles of the lanes, such as the notched profiles of the curbstones delimiting and similar changes, the braking effect of the shock absorbers is reduced so that the tires may always maintain contact with the ground. For these applications, the shock absorbers are provided with an additional bypass valve 30 (see FIGS. 14a, 14b) comprising a piston 31, a spring 34 acting on said piston 31, and a ratchet 32 maintaining the valve in a closed position by a rear spring 33. In this bypass valve 30, the piston 31 can instantaneously move backward under the effect of an impact produced by the fluids moved by sudden displacement of piston 3, and return to its closing positions, equally fast, at the end of such occurrences. In these conditions and particularly during the compression phases, the sudden backward movement of piston 31 causes ducts 26 and 27 to connect, leaving the driving fluids to pass directly from upper chamber 8 to lower chamber 9, or vice-versa (according to the indications of arrows 104), temporarily excluding the braking intervention of compression 16 and/or 12 extension valves. In order the movement of piston 31 occur suddenly, the piston 31 is normally held in closed valve position by the ratchet 32, pushed by the calibrated rear spring 33. By adjusting the pressure exerted by the spring 33 on ratchet 32, for example using regulator 60 and knob 61 depicted in FIG. 14b, it is possible to calibrate the full opening of valve 30, or to calibrate the release of ratchet 32 and the backward movement of piston 31, at a well-determined pressure of the driving fluid acting on the piston itself, to which an equally well-determined suspension speed corresponds. The valve 30 closes again, with piston 31 returning to the initial position under the action of the push produced on its rear part by a counter spring 34, as soon as the intervention speed of the shock absorber falls again within the normal values and the piston 3/stem 4 assembly exceeds one of the upper and lower dead points.

By varying the characteristics and ratios of the components of the hydraulic shock absorber of the present invention, or by modifying the form and/or the configuration of the variable section of pin 5, varying the width and/or length of calibrated ports 19 and 15, varying the dimensions and/or the form of through sections 20, varying the diameter of pistons 18 and 14 as a function of the diameter of piston 3, varying the characteristics of single or multiple springs 17 and 13, whether or not adopting the calibrated bypass valves 30, and so forth, it is possible to size and adjust, basically at the millimeter level, the shock absorbers and the corresponding desired braking effect, which the shock absorbers can produce, depending on the type of associated suspensions and on the applications of the vehicles.

The function of cylinder 21 and respective floating piston 22 is to absorb the changes in volume due to the dimensions of hollow stem 4 sliding in cylinder 2. They keep the driving fluid pressure constant, thanks to the contracting action of a compressed gas in chamber 23; in this manner, the formation of air/oil emulsions is prevented and the boiling point of said fluid can be raised.

Figures 1, 2, 3:
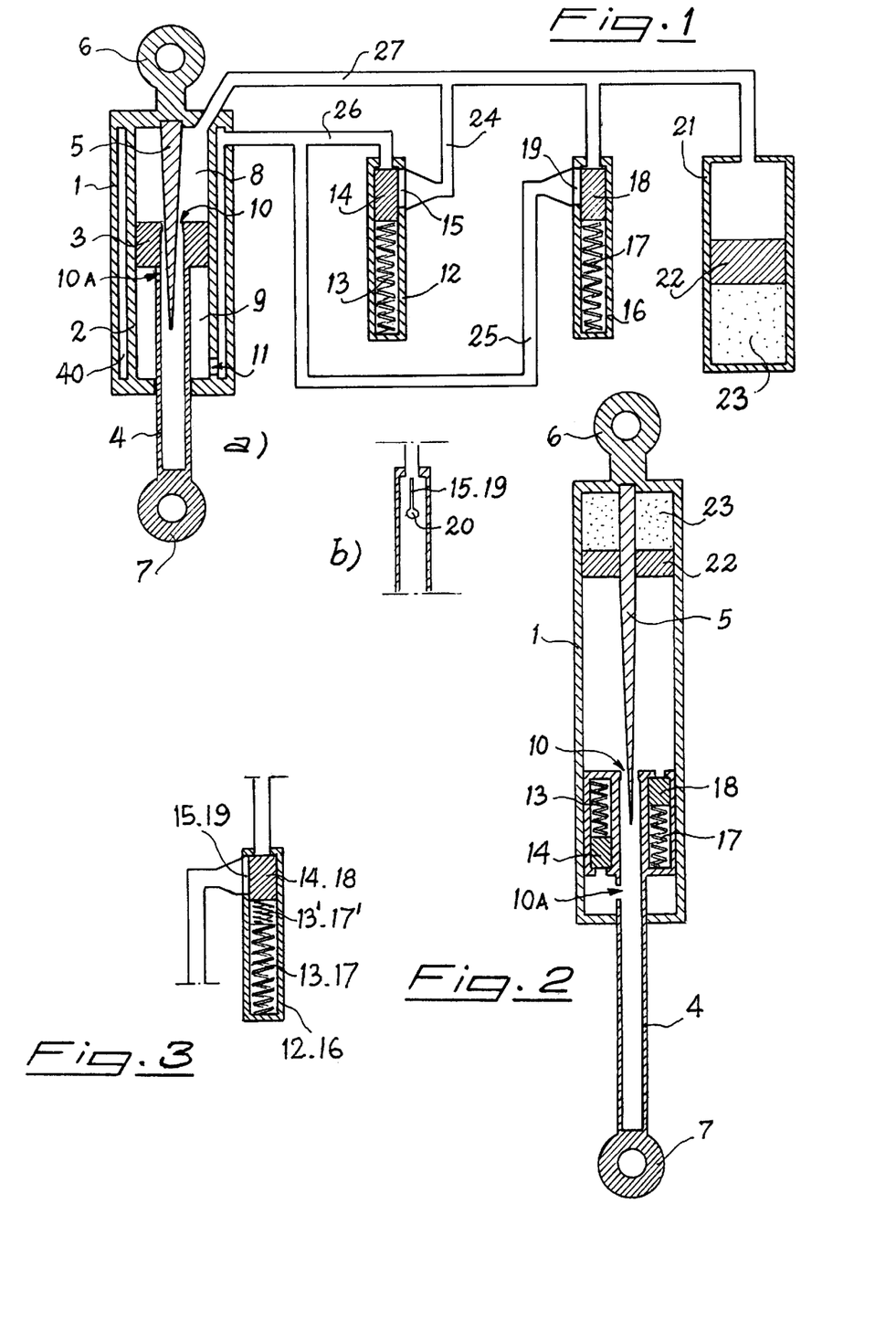
FIG. 2 represents the schematic view of the section of the second example of embodiment of the hydraulic shock absorber with progressive braking effects of the present invention, with extension and compression valves executed directly on the piston.
FIG. 3 represents the schematic view of the cross section of a compression or extension valve with differentiated contrast elastic components.

The magnitude of the braking effect at different speeds can be obtained by applying single elastic elements 17 and 13 on the compression valve 16 and extension valve 12, as described. Alternatively, variable load elements, or even more associated contrast elements 17,17' and 13,13', with different characteristics and reactions, which work in series on respective pistons 18 and 14, can be applied.

From the accompanying drawings it is possible to see that the connections between the shock absorber and the compression valve 16 and extension valve 12 have been represented according to an embodiment providing for an interspace 40, coaxial between the outer 1 and the inner 2 cylinders for circulation of the control fluid with upper in/out connector. It is evident that, in the case of connection of duct 26 in lower position, this interspace is not necessary and the shock absorber consists only of the single cylinder 2 for sliding the piston 3.

From the same drawings it is evident that the compression valve 16 and extension valve 12 and compensation cylinder 21 can be produced separately from the shock absorber and distinct from each other or combined as a group. In the second case, the solution may be advantageous for special applications on sport and/or competition automobiles, for a better distribution of weights and in order to facilitate the simple and quick adjustment and/or replacement of the various components of said valves, depending on the requirements at the time. The various connections can be made with rigid or flexible ducts, according to the requirements concerning position and/or maintenance operation. In this solution, the valves may be provided also with external load regulators (50, 50') of springs 17 and 13 or 17–17' and 13–13' or with variable load elements, with manual operation by means of knobs (51, 51'), which can be operated directly by the vehicle drivers. For less sophisticated applications, or those requiring traditional operation or less demanding ones, the above mentioned components can be comprised in the shock absorber assembly itself, as shown in FIG. 2.

Although the invention has been described in conjunction with specific embodiments, it is evident that many alternatives and variations will be apparent to those skilled in the art in the light of the foregoing description. Accordingly, the invention is intended to embrace all of the above alternatives and variations that fall within the spirit and scope of the appended claims.

What is claimed is:

1. A hydraulic shock absorber with progressive braking effect comprising:
   a cylinder anchored to the body of a vehicle and filled with a driving fluid;
   a piston anchored to a mobile component of a suspension and sliding axially into said cylinder, said piston dividing the cylinder into sequential coaxial upper and lower chambers and being provided with a central opening connecting said upper chamber to said lower chamber;
   a cone-shaped stationary pin fixed to the cylinder and sliding into the central opening of the piston;
   a compression valve and an extension valve each connected to the upper and lower chambers and provided with a variable elastic load and with a through port with calibrated section passages having a lower end with progressively increasing passage areas; and
   an additional bypass valve with instantaneous closing/opening, depending on the impact effect of instantaneous changes in the displacement speed of piston of the shock absorber, said bypass valve being interposed between the cylinder and said compression and extension valves,
   wherein the bypass valve is provided with a piston with an adjustable opening/closing tripping pawl with elastic quick return means.

2. The hydraulic shock absorber according to claim 1, wherein the stationary pin is associated with the cylinder and, through the upper chamber, is engaged by progressive insertion into a stationary port, created on the piston; said stationary port communicating with said lower chamber; the upper and lower chambers being also connected to each other through ports and/or ducts.

3. The hydraulic shock absorber according to claim 1 or 2, wherein the through section of the stationary port is variable, depending on the variable configuration of the section of pin, and on the sliding compression and/or extension movement of piston in the cylinder.

4. The hydraulic shock absorber according to claim 1, wherein, with the shock absorber in the compression phase, a portion of the driving fluid moves from the upper chamber into the lower chamber through the stationary port with progressively reducing section, and the rest of the fluid moves from said upper chamber to said lower chamber through calibrated port of the compression valve; the adjustable opening thereof being proportional to the sliding speed of piston.

5. The hydraulic shock absorber according to claim 1, wherein, with the shock absorber in the extension phase, a portion of the driving fluid moves from the lower chamber into the upper chamber through the stationary port with progressively increasing section, and the rest of the fluid moves from said lower chamber to said upper chamber through calibrated port of the extension valve; the adjustable opening thereof being proportional to the sliding speed of piston.

6. The hydraulic shock absorber according to claim 1, wherein, the cylinder includes an internal coaxial cylinder, in which said piston slides to form a through interspace.

7. The hydraulic shock absorber according to claim 1, wherein the variable elastic load of the compression and extension valves are equipped with external adjustments means.

8. The hydraulic shock absorber according to claim 1, wherein the compression and extension valves are arranged externally and separately from the cylinder.

* * * * *

UNITED STATES PATENT AND TRADEMARK OFFICE
CERTIFICATE OF CORRECTION

PATENT NO.   : 6,467,593 B1
DATED        : October 22, 2002
INVENTOR(S)  : Corradini et al.

It is certified that error appears in the above-identified patent and that said Letters Patent is hereby corrected as shown below:

<u>Title page,</u>
Item [30], Foreign Application Priority Data, insert
-- [30]         Foreign Application Priority Data
Sep. 30, 1999   (IT) ................................. RE99A000098 --

Signed and Sealed this

Twenty-fifth Day of February, 2003

JAMES E. ROGAN
*Director of the United States Patent and Trademark Office*